United States Patent
Williams et al.

(10) Patent No.: US 12,460,849 B2
(45) Date of Patent: Nov. 4, 2025

(54) DEFROST SYSTEMS AND METHODS FOR HEAT PUMP WATER HEATERS

(71) Applicant: Rheem Manufacturing Company, Atlanta, GA (US)

(72) Inventors: Alex Williams, Montgomery, AL (US); Piyush Porwal, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 18/493,225

(22) Filed: Oct. 24, 2023

(65) Prior Publication Data
US 2024/0053072 A1     Feb. 15, 2024

Related U.S. Application Data

(63) Continuation of application No. 17/218,390, filed on Mar. 31, 2021, now Pat. No. 11,835,277.

(51) Int. Cl.
| | | |
|---|---|---|
| *F25B 47/02* | (2006.01) | |
| *F24D 17/02* | (2006.01) | |
| *F25B 49/02* | (2006.01) | |

(52) U.S. Cl.
CPC ............... *F25B 47/02* (2013.01); *F24D 17/02* (2013.01); *F25B 49/022* (2013.01); *F25B 2347/02* (2013.01); *F25B 2600/02* (2013.01); *F25B 2700/02* (2013.01); *F25B 2700/11* (2013.01);
(Continued)

(58) Field of Classification Search
CPC .... F24D 17/02; F25B 49/022; F25B 2347/02; F25B 2600/02; F25B 2700/02; F25B 2700/11; F25B 2700/2104; F25B 2700/21174
See application file for complete search history.

(56) References Cited

U.S. PATENT DOCUMENTS

| | | | | |
|---|---|---|---|---|
| 4,332,137 A | * | 6/1982 | Hayes, Jr. .............. | F25B 47/022 62/81 |
| 4,474,018 A | | 10/1984 | Teagan | |

(Continued)

FOREIGN PATENT DOCUMENTS

| | | |
|---|---|---|
| CN | 2663880 Y | 12/2004 |
| DE | 112014005287 B4 | 8/2016 |

(Continued)

OTHER PUBLICATIONS

KR 10-0686765 (English Translation) (Year: 2007).*

(Continued)

*Primary Examiner* — Jonathan Bradford
(74) *Attorney, Agent, or Firm* — Eversheds Sutherland (US) LLP

(57) ABSTRACT

A heat pump water heater can include a refrigerant circuit, an evaporator coil in fluid communication with the refrigerant circuit, a fan configured to move air across the evaporator coil, one or more temperature sensors, a heating element located proximate an air flow path between the fan and the evaporator, and a controller. The controller can be configured to receive temperature data from the one or more temperature sensors and, in response to the temperature data, output instructions for the fan to move air across the heating element to the evaporator coil.

16 Claims, 12 Drawing Sheets

(52) U.S. Cl.
CPC .............. *F25B 2700/2104* (2013.01); *F25B 2700/21174* (2013.01)

(56) References Cited

U.S. PATENT DOCUMENTS

| | | | | |
|---|---|---|---|---|
| 4,483,153 | A * | 11/1984 | Wallace | A47F 3/0447 |
| | | | | 62/82 |
| 4,979,371 | A * | 12/1990 | Larson | F25B 47/022 |
| | | | | 62/81 |
| 9,664,425 | B2 * | 5/2017 | Tsai | F24H 15/385 |
| 2008/0115512 | A1 * | 5/2008 | Rizzo | B60H 1/00428 |
| | | | | 62/134 |
| 2008/0190131 | A1 | 8/2008 | Giallombardo et al. | |
| 2011/0016896 | A1 | 1/2011 | Oomura et al. | |
| 2015/0253049 | A1 | 9/2015 | Tsai | |
| 2016/0332504 | A1 | 11/2016 | Blatchley et al. | |
| 2018/0142934 | A1 * | 5/2018 | Junge | F25D 17/065 |
| 2018/0195788 | A1 | 7/2018 | Nolte | |
| 2018/0209677 | A1 * | 7/2018 | Yang | F25B 47/02 |
| 2018/0238561 | A1 * | 8/2018 | Yin | F24H 15/335 |
| 2019/0257567 | A1 | 8/2019 | Sanders et al. | |
| 2020/0056833 | A1 * | 2/2020 | Park | F25D 29/00 |
| 2021/0031928 | A1 * | 2/2021 | Burd | F25D 17/067 |

FOREIGN PATENT DOCUMENTS

| | | | |
|---|---|---|---|
| KR | 100686765 | B1 | 2/2007 |
| WO | 2020189586 | A1 | 9/2020 |

OTHER PUBLICATIONS

WO 2020/189586 (English Translation) (Year: 2020).*
International Search Report for PCT/EP2022/022471 dated Jul. 6, 2022 (16 pages).

* cited by examiner

DEFROST SYSTEMS AND METHODS FOR HEAT PUMP WATER HEATERS

CROSS-REFERENCE TO RELATED APPLICATIONS

The present application claims priority to, the benefit of, and is a continuation application of U.S. application Ser. No. 17/218,390, filed Mar. 31, 2021, which is hereby incorporated by reference herein in its entirety.

FIELD OF DISCLOSURE

The present disclosure relates generally to systems and methods for reducing frost accumulation on heat pump evaporator coils. More specifically, the disclosed technology can relate to reducing frost accumulation on heat pumps used for water heating purposes.

BACKGROUND

When a heat pump is operating to provide heated water, the evaporator coil temperature can sometimes fall below the ambient air temperature. The temperature difference between the evaporator coil and the ambient air can lead to moisture accumulation on the evaporator coil as moisture in the ambient air condenses on the colder evaporator coil. In certain conditions, the temperature of the evaporator coil will fall below freezing and cause the accumulated moisture to eventually freeze, forming frost and ice. This can be particularly troublesome when there is a demand for heated water while the air temperature remains above freezing. In these conditions, the evaporator coil temperature can fall below zero and moisture in the air can continue to accumulate as frost and ice on the evaporator coil until the coil rises above the freezing temperature of water. As the frost continues to accumulate on the evaporator coil, the heat pump can experience degraded performance and damaged components.

To reduce frost accumulation, some heat pump systems will operate the heat pump in a reverse cycle to move heated refrigerant through the frosted coil until the frost is melted. In water heating applications, however, running the heat pump in the reverse cycle causes the heat pump system to remove heat from the subject water, which is counterproductive to the purpose of the water heating system.

What is needed, therefore, are improved systems and methods for reducing frost accumulation on the evaporator coil of a heat pump system. This and other problems are addressed by the technology disclosed herein.

SUMMARY

These and other problems are be addressed by the technologies described herein. Examples of the present disclosure relate generally to reducing frost accumulation on a heat pump evaporator coil and, more specifically, to reducing frost accumulation on an evaporator coil of a heat pump's water heater.

The disclosed technology includes a heat pump water heater, which can include a water tank configured to hold water for heating and a refrigerant circuit that is in fluid communication with an evaporator coil, a condenser coil, and a compressor. The condenser coil can be in thermal communication with the water tank. The heat pump water heater can include a fan configured to move air across the evaporator coil, one or more temperature sensors, and a controller. The controller can be configured to receive temperature data from the one or more temperature sensors and, in response to determining that the temperature data indicates a temperature less than a predetermined temperature threshold, output instructions for the compressor to deactivate and the fan to move air across the evaporator coil.

The one or more temperature sensors can include (i) an ambient temperature sensor configured to detect a temperature of ambient air at a location of the heat pump water heater, (ii) an evaporator temperature sensor configured to detect a temperature of at least a portion of the evaporator coil, or (iii) a suction line temperature sensor configured to detect a temperature of a least a portion of the suction line portion of the refrigerant circuit.

The instructions outputted by the controller can instruct the fan to move air across the evaporator coil for a predetermined duration.

The predetermined temperature threshold can be a first predetermined temperature threshold, and the controller can be further configured to (i) receive supplemental temperature data from the one or more temperature sensors and (ii) output instructions for the fan to deactivate subsequent to determining that the supplemental temperature data indicates a temperature that is greater than or equal to a second predetermined threshold.

The second predetermined threshold can be approximately equal to the first predetermined threshold.

The instructions for the fan to move air across the evaporator coil can comprise instructions for the fan to operate in a reverse polarity such that the fan moves air from an air outlet of the heat pump water heater system to an air inlet of the heat pump water heater system.

The heat pump water heater system can further comprise a heating element located in or proximate an air flow path between the fan and the evaporator.

The evaporator coil can be a first evaporator coil, and the heat pump water heater can further comprise a second evaporator coil in fluid communication with the refrigerant circuit.

The first evaporator coil can be located on a first side of an evaporator housing, the second evaporator coil can be located on a second side of the evaporator housing, and the heating element can be disposed between the first and second evaporator coils.

The controller can be further configured to output instructions for the heating element to activate in response to determining that the temperature data indicates the temperature less than the predetermined temperature threshold.

The instructions for the fan to move air across the evaporator coil can comprise instructions for the fan to operate in a reverse polarity such that the fan moves air from an air outlet of the heat pump water heater system, to the heating element, to the evaporator coil, and to an air inlet of the heat pump water heater system.

The heat pump water heater system can further comprise a humidity sensor configured to detect a humidity of the ambient air. The controller can be further configured to receive humidity data from the humidity sensor and output the instructions for (i) the compressor to deactivate and (ii) the fan to move air across the evaporator coil in response to determining that (a) the temperature data indicates the temperature less than the predetermined temperature threshold and (b) the humidity data indicates a humidity greater than or equal to a predetermined humidity threshold.

The condenser coil can be wrapped around at least a portion of an exterior surface of the water tank.

The condenser coil can be at least partially disposed within an interior portion of the water tank.

The condenser coil can be a first condenser coil, and the heat pump water heater system can further comprise a second condenser coil in fluid communication with the refrigerant circuit and in thermal communication with the water tank.

The disclosed technology can include a non-transitory, computer-readable medium having instructions stored thereon that, when executed by one or more processors, can cause a heat pump water heater controller to receive temperature data from one or more temperature sensors. The instructions, when executed, can cause the heat pump water heater controller to, in response to determining based at least on part on the temperature data that frost accumulation on an evaporator coil of a heat pump water heater is likely, output first instructions for a compressor of the heat pump water heater to deactivate and output second instructions for a fan of the heat pump water heater to activate.

The second instructions can instruct the fan to operate in a reverse direction such that air is moved in through an air outlet of the heat pump water heater and the air is moved out through an air inlet of the heat pump water heater.

The instructions, when executed, can cause the heat pump water heater controller to receive humidity data from a humidity sensor of the heat pump water heater system and output the first instructions and the second instructions in response to determining, based at least on part on the temperature data and the humidity data, that frost accumulation on the evaporator coil is likely.

The instructions, when executed, can cause the heat pump water heater controller to output third instructions for a heating element of the heat pump water heater to activate.

The instructions, when executed, can cause the heat pump water heater controller to compare the temperature data to a plurality of temperature thresholds. The instructions, when executed, can cause the heat pump water heater controller to output the first instructions and the second instructions in response to determining that the temperature data indicates a temperature that is less than a first temperature threshold of the plurality of temperature thresholds. The instructions, when executed, can cause the heat pump water heater controller to output the first instructions, the second instructions, and the third instructions in response to determining that the temperature data indicates a temperature that is less than a second temperature threshold of the plurality of temperature thresholds that is less than the first temperature threshold.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale. The drawings are incorporated into and constitute a portion of this disclosure, illustrating various implementations and aspects of the disclosed technology. Together with the description, the drawings serve to explain the principles of the disclosed technology.

DETAILED DESCRIPTION

Figure 1A:
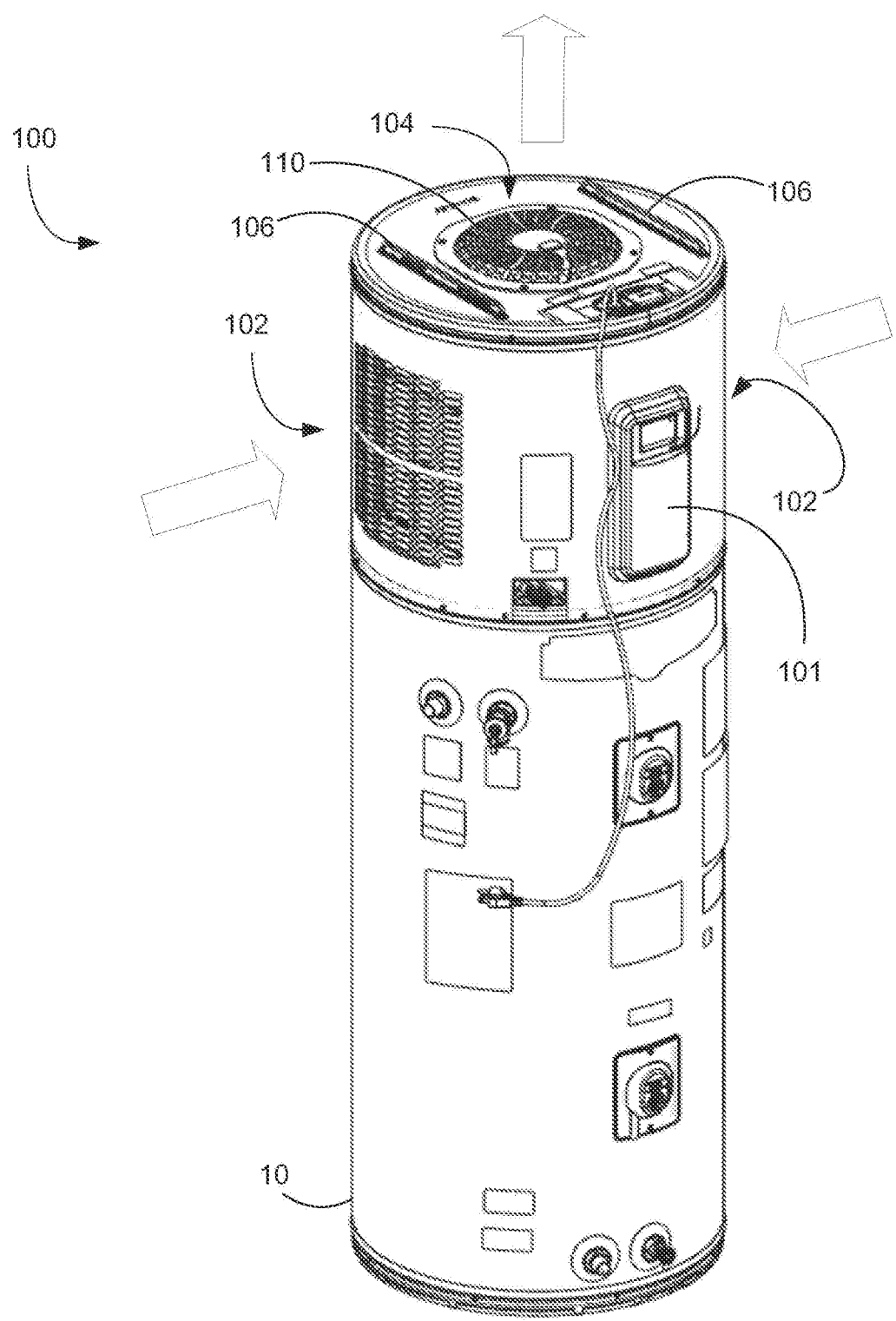
FIG. 1A illustrates a perspective view of an example heat pump water heater, in accordance with the disclosed technology.

Throughout this disclosure, systems and methods are described with respect to reducing frost accumulation on an evaporator coil of a heat pump's water heater. For example, the disclosed technology can reduce or eliminate frost accumulation on an evaporator coil by directing warmer air (e.g., ambient air, heated air) across the evaporator coil after the heat pump is shut down (i.e., no longer operating in a heating mode). As explained herein, when the heat pump is operating in a heating mode under certain conditions, frost can accumulate on the evaporator coil. For example, this can occur when the evaporator coil temperature falls below the freezing temperature of water, and the moisture in the warmer ambient air condenses on the evaporator coil and eventually freezes. To reduce the accumulated frost, the disclosed technology includes, among other examples described herein, energizing a fan after the heat pump has shut down to direct the warmer ambient air across the evaporator coil to melt the accumulated frost.

While the disclosed technology is described throughout this disclosure in relation to water heating applications, those having skill in the art will recognize that the disclosed technology is not so limited and can be applicable to other scenarios and applications. For example, it is contemplated that the disclosed technology can be applicable to any heat pump systems, such heat pump systems used for heating, ventilation, and air conditioning (HVAC) applications. Alternatively or in addition, the disclosed technology can be applied in pool heating applications, various industrial applications, and any other applications or scenarios implementing a heat pump.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

Unless otherwise specified, all ranges disclosed herein are inclusive of stated end points, as well as all intermediate values. By way of example, a range described as being "from approximately 2 to approximately 4" includes the values 2 and 4 and all intermediate values within the range. Likewise, the expression that a property "can be in a range from approximately 2 to approximately 4" (or "can be in a range from 2 to 4") means that the property can be approximately 2, can be approximately 4, or can be any value therebetween. Further, the expression that a property "can be between approximately 2 and approximately 4" is also inclusive of the endpoints, meaning that the property can be approximately 2, can be approximately 4, or can be any value therebetween.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Although the disclosed technology may be described herein with respect to various systems and methods, it is contemplated that embodiments or implementations of the disclosed technology with identical or substantially similar features may alternatively be implemented as methods or systems. For example, any aspects, elements, features, or the like described herein with respect to a method can be equally attributable to a system. As another example, any aspects, elements, features, or the like described herein with respect to a system can be equally attributable to a method.

Reference will now be made in detail to example embodiments of the disclosed technology, examples of which are illustrated in the accompanying drawings and disclosed herein. Wherever convenient, the same reference numbers will be used throughout the drawings to refer to the same or like parts.

Figure 1B:
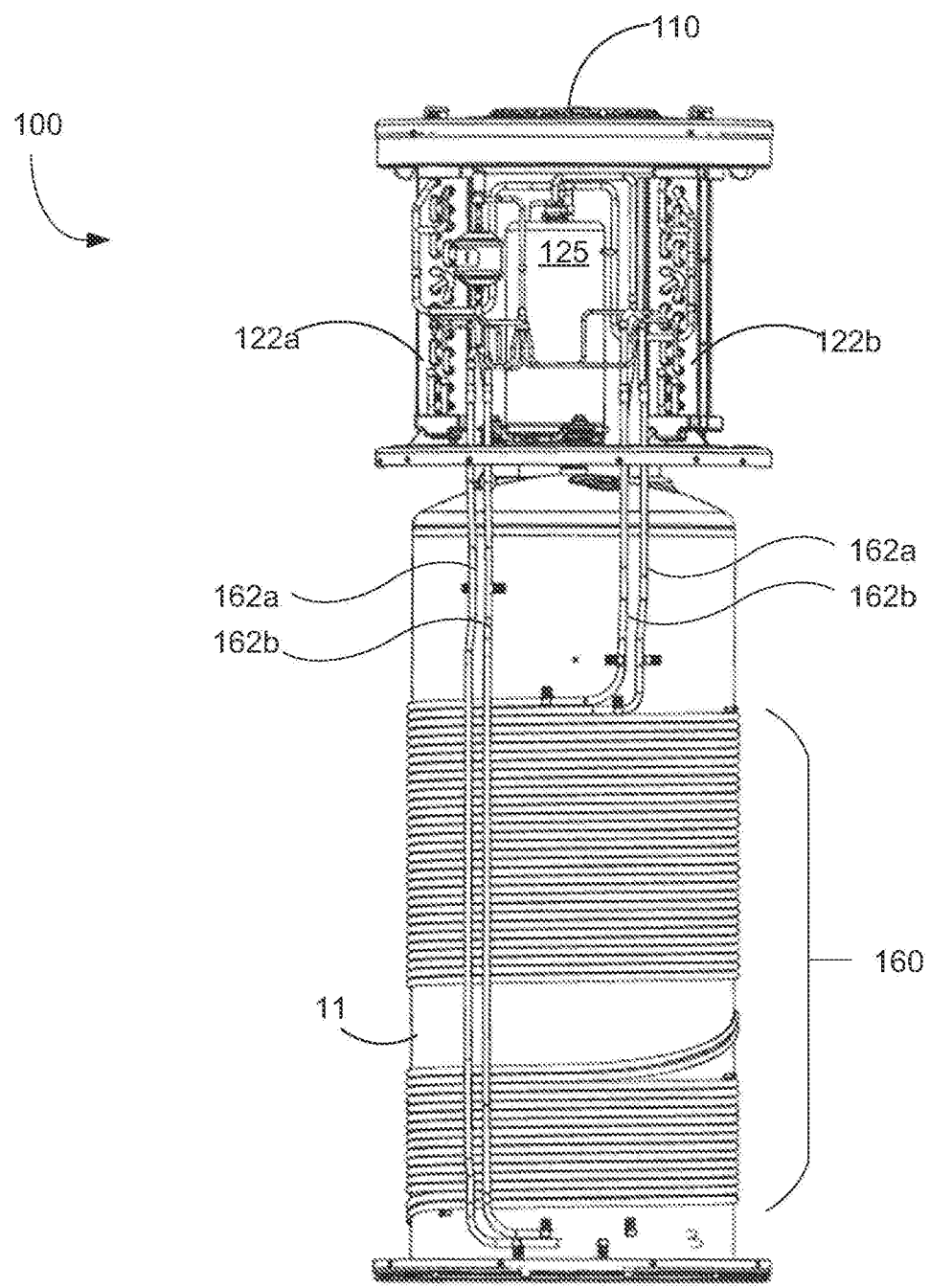
FIG. 1B illustrates a plan view of an example heat pump water heater with the outer shell removed for clarity of illustration, in accordance with the disclosed technology.
Figure 2A:
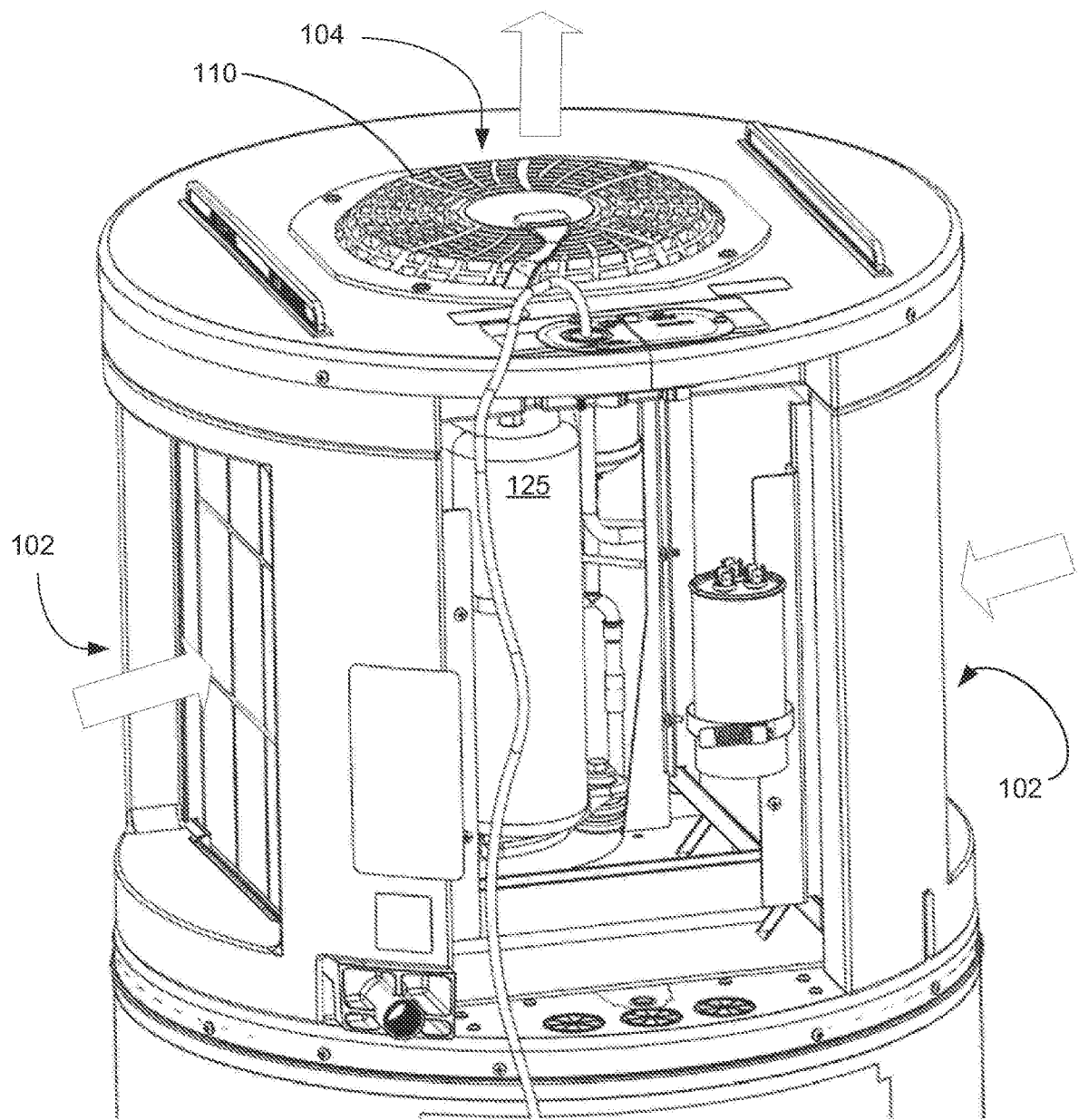
FIGS. 2A and 2B each illustrate a perspective view of a portion of an example heat pump system for a heat pump water heater with certain components omitted for clarity of illustration, in accordance with the disclosed technology.
Figure 2B:
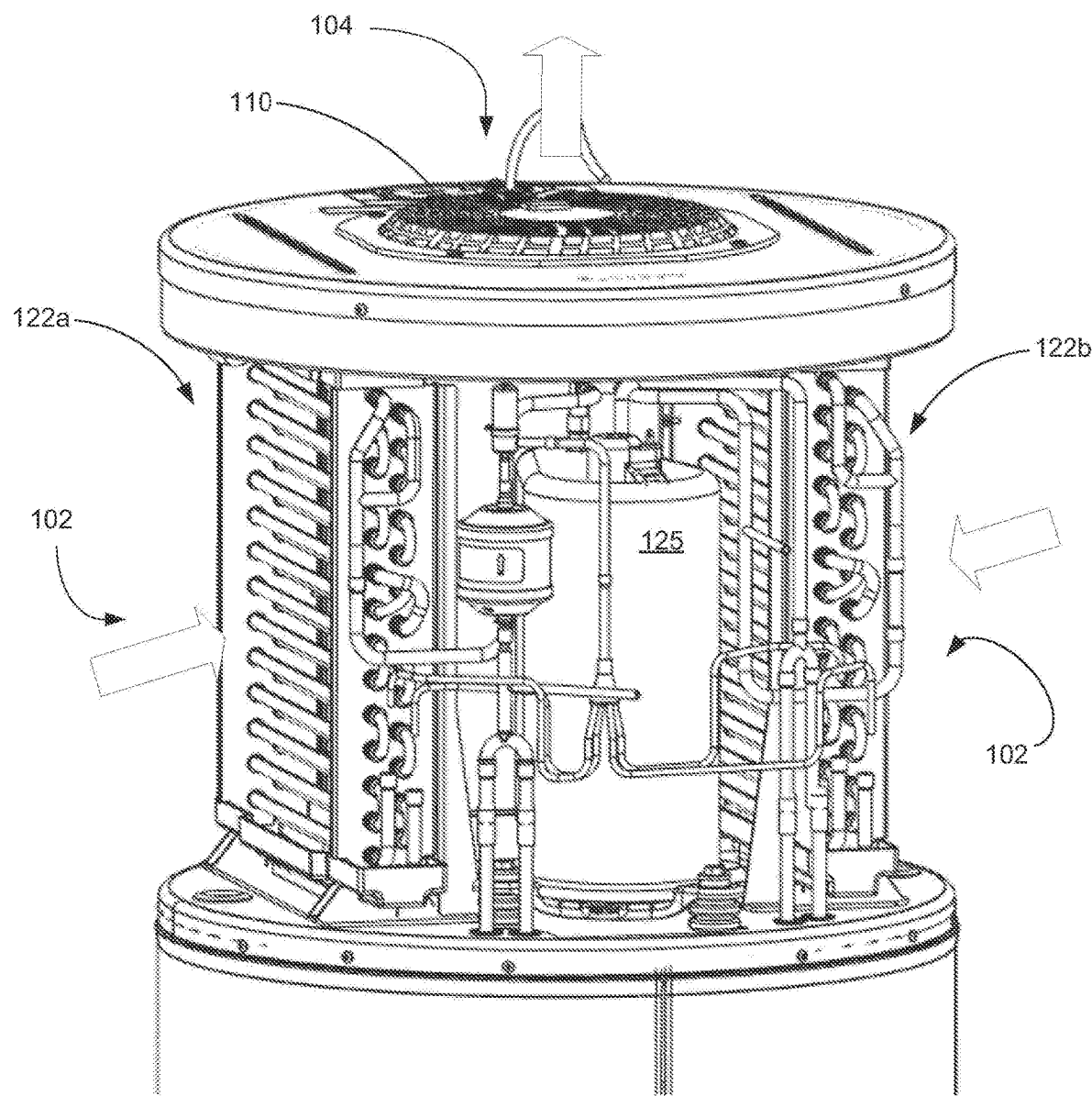
Figure 3A:
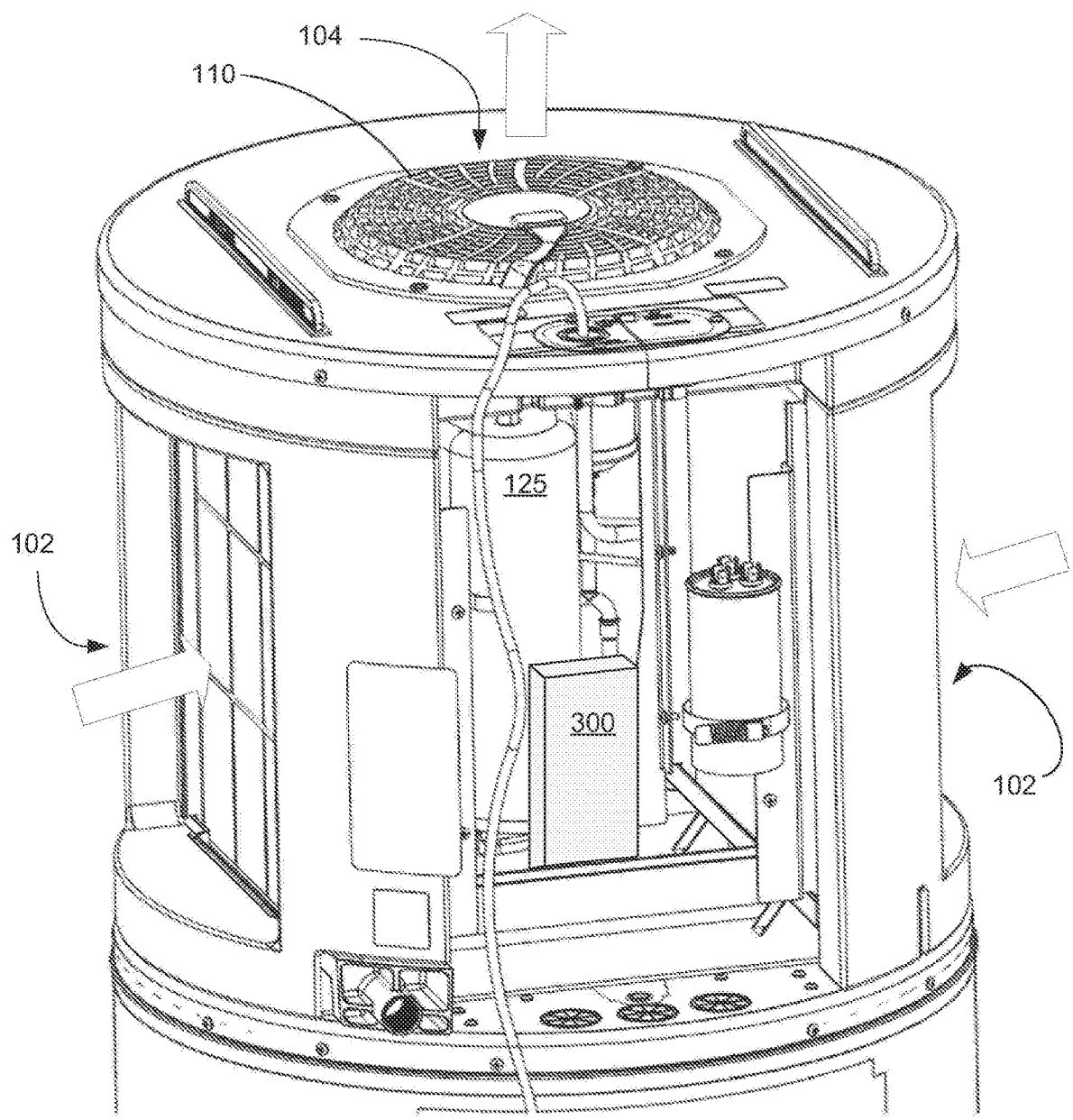
FIGS. 3A, 3B, 4A, and 4B each illustrate an example heat pump system including a heating element, in accordance with the disclosed technology.
Figure 3B:
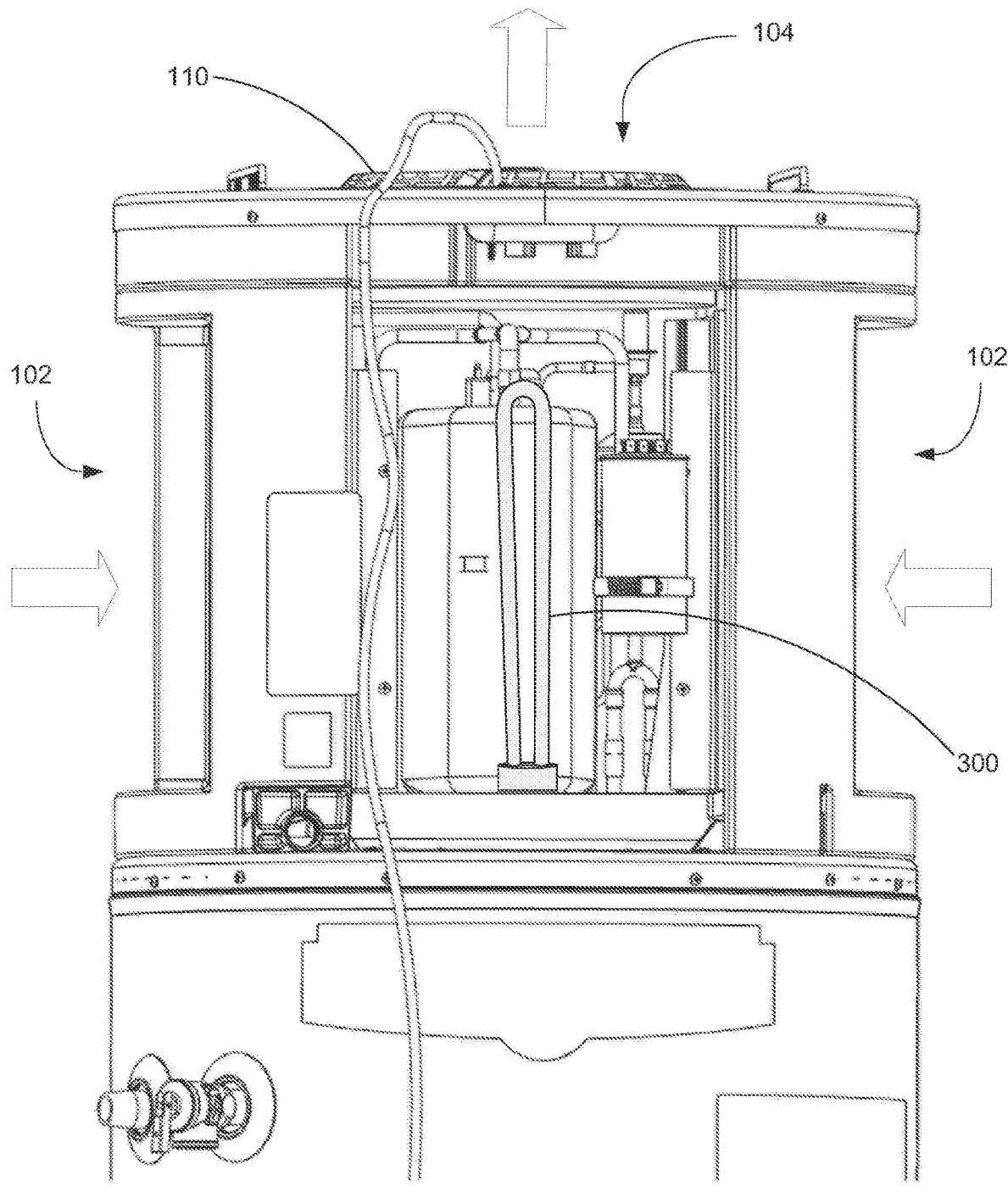

Referring now to the drawings, in which like numerals represent like elements, examples of the present disclosure are herein described. As will be described in greater detail, the present disclosure can include a system and method for reducing frost accumulation on heat pump evaporator coils. To provide a background of the system described in the present disclosure, components of a heat pump water heating system are shown in FIGS. 1A, 1B, and 2 and will be discussed first.

As shown in FIG. 1, a heat pump system 100 can be used to heat water in a water heater 10. The water heater can include a tank 11, and the heat pump system 100 can be located substantially on top of the tank 11. The heat pump system 100 can be positioned at other locations, provided the condenser coil 130 is in thermal communication with the tank 11 (e.g., wrapper around the exterior of the tank, extending at least partially into the tank 11). The heat pump system 100 can include, or be in communication with, a controller 190. The controller 190 can include memory 192, one or more processors 194, a communication interface 196, and a user interface 198. The controller 190 can be in electronic communication (wired or wireless) with various components described herein, include the compressor 125, the fan 110, one or more temperature sensors, and the like. The memory 192 can have instructions stored thereon that, when executed by the processor(s) 194, cause the heat pump system 100 (or one or more components thereof) to perform certain actions, such as those described herein. One of skill in the art will appreciate that a system 100 for reducing frost accumulation can include other components not described herein or fewer components than described herein.

The heat pump system 100 can include one or more air inlets 102 and one or more air outlets 104. While the drawings generally depict a heat pump system 100 including two air inlets 102 on opposites sides of the water heater 10 and a single air outlet 104 located on the top surface of the heat pump system 100, the disclosed technology is not so limited. For example, the heat pump system 100 can include a single air inlet 102, more than two air inlets 102, and/or multiple air outlets 104. Moreover, the air inlet(s) 102 and air outlet(s) 104 can be arranged in any configuration such that air can be passed across an evaporator subsytem 120 of the heat pump system 100. Optionally, the heat pump system 100 can include one or more filters 106 to prevent debris from entering the interior of the heat pump water heater 100. The filter(s) can be positioned proximate (e.g., immediately downstream) a corresponding air inlet 102.

The heat pump system 100 can include an evaporator subsystem 120 that can include a plurality of evaporators 122. The example view shown in the figures includes a first evaporator 122a and a second evaporator 122b. It will be appreciated, however, that a single evaporator 122 can be included in the evaporator subsystem 102, or more than two evaporators 122 can be included in the evaporator subsystem 102; when reference is made to a first evaporator 122a and a second evaporator 122b herein, it will be understood that the disclosed technology includes more than two evaporators 122. As will be appreciated, the present systems and devices can employ a plurality of evaporators 122 to increase the total surface area of the evaporator subsystem 120 and, thus, increase the amount of heat that can be absorbed by refrigerant in said evaporators 122. As will be described in greater detail below, the evaporators 122 of the evaporator subsystem 120 can be in fluid communication with a single compressor 125 to thereby further limit the electrical load required to heat the refrigerant.

Figure 1C:
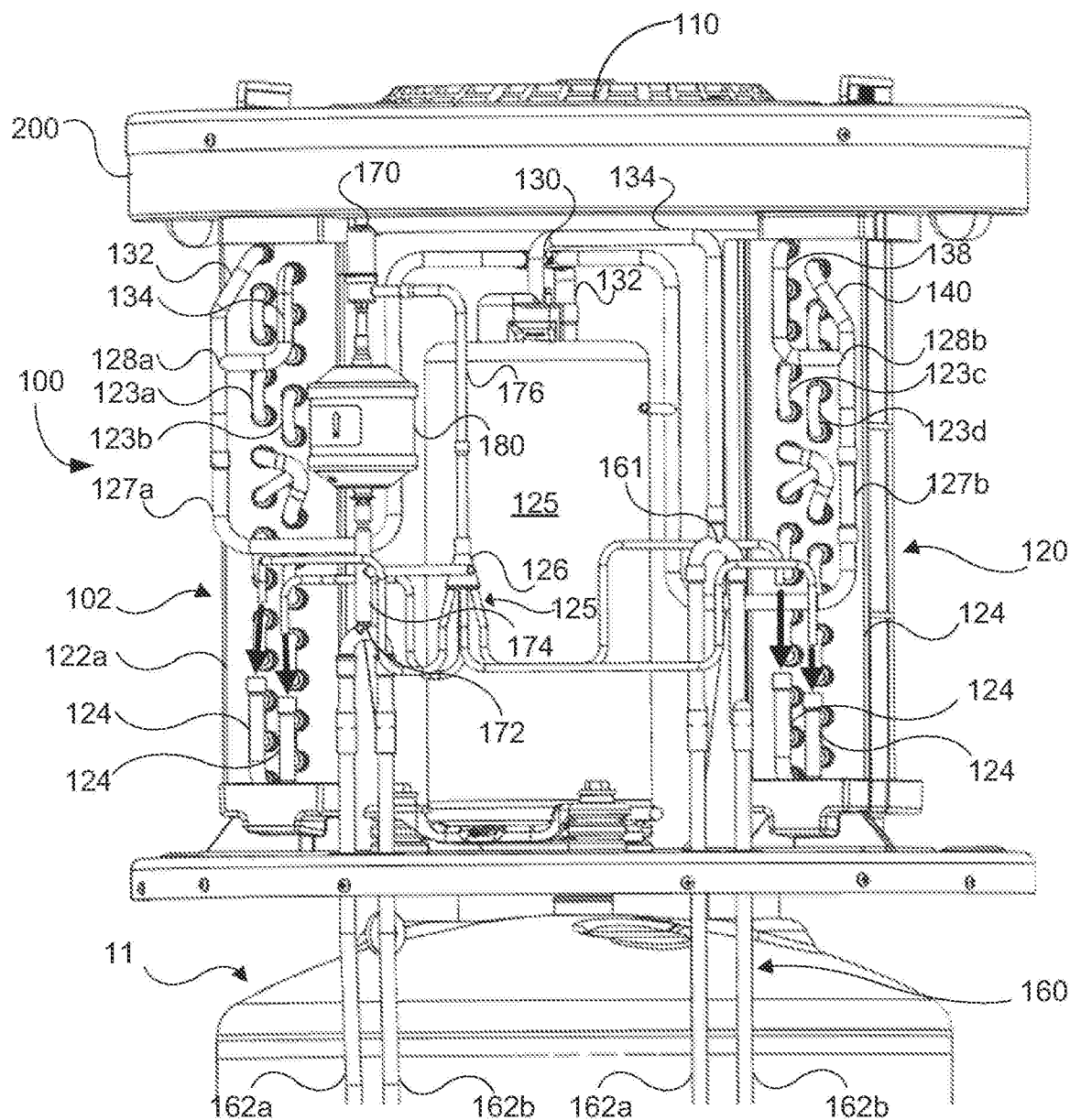
FIG. 1C illustrates an enlarged plan view of portions of a heat pump system of the heat pump water heater shown in FIG. 1B, in accordance with the disclosed technology.

The evaporators 122 (e.g., the first evaporator 122a and the second evaporator 122b) can have any number of evaporator designs, for example and not limitation micro-channel, tube-fin, tube (including micro-tube and mini-tube evaporators), roll bond, and the like. In any case, one or more of the evaporators 122 can include more than one refrigerant path disposed within the evaporator 122 to further increase the surface area and, thus, refrigerant heating. For example, in the case of a tube evaporator, one or more of the evaporators 122 can include more than one tube or coil network within the evaporator(s) 122 (e.g., two parallel tube paths). Referring to FIG. 1C in particular, the first evaporator 122a can include a first coil network 123a and a second coil network 123b, which can each be supplied refrigerant by coil inlet(s) 124 located at an end of the first coil network 123a and/or second coil network 123b; in addition, or as an alternative, the second evaporator 106 can include a third coil network 123c and a fourth coil network 123d, which can each be supplied refrigerant by coil inlet(s) 124 located at an end of the third coil network 123c and and/or fourth coil network 123d. As will be described in greater detail below, each coil inlet 124 can be in fluid communication with a refrigerant distributor 126 that provides equal and/or required amounts of refrigerant to each coil inlet 124 to ensure liquid refrigerant enters the coil network(s) 123 and vaporized refrigerant leaves the network(s) 123.

As described above, the heat pump system 100 can have one or more compressors 125 that receive the vaporized refrigerant from the evaporator subsystem 102 and compresses the refrigerant to increase the heat of the refrigerant before it passes to a condenser subsystem 160, which described in greater detail below. The example heat pump system 100 shown in FIGS. 1A-1C includes a single compressor 125, though more than one compressor 125 can be employed within the present systems. A single compressor 125, however, can decrease the electrical load required of the heat pump system 100, thereby relying mostly on the multi-evaporator evaporator subsystem 120 to perform a greater proportion of the refrigerant heating.

The compressor 125 can receive the refrigerant from the evaporator subsystem 120 via one or more evaporator return conduits that create a flow path between the coil network(s) 123 and the compressor 125. Referring to the two-evaporator system shown in FIG. 1, the compressor 125 can receive refrigerant from the first evaporator 104 via a first evaporator return 127a. In systems that include more than one coil networks in an evaporator, the first evaporator return 127a can include a first convergence 128a that combines a first exit conduit 129a (associated with the first coil network 123a) and a second exit conduit 129b (associated with the second coil network 123b) into a single flow path at the first evaporator return 127a. Similarly, the compressor 125 can receive refrigerant from the second evaporator 122b via a second evaporator return 127b. The second evaporator return 127b can include a second convergence 128b that combines a third exit conduit 129c (associated with the third coil network 123c) and a fourth exit conduit 129d (associated with the fourth coil network 123d) into a single flow path at the second evaporator return 127b. In heat pump systems 100 that have a single compressor 125, the first evaporator return 127a and the second evaporator return 127b can join at a compressor convergence 130. Once joined at the compressor convergence 130, a single flow path into the compressor 125 can be created at a compressor inlet 132. In systems that include more than one compressor 125, the first evaporator return 127a can be in fluid communication with a first compressor 125 and the second evaporator return 127b can be in fluid communication with a second compressor 125, as a non-limiting example.

Once the refrigerant is compressed by the one or more compressors 125, the heated and compressed refrigerant can exit the compressor(s) 125 at a compressor outlet 134. The compressor outlet 134 can then provide the superheated refrigerant to a condenser subsystem 160. The condenser subsystem 160 can include the condenser network that heats the water in the water tank 11. The condenser subsystem 160 can include one or more condenser circuits that heat the water. The present discourse describes systems having two condenser circuits, for example a first condenser circuit 162a and a second condenser circuit 162b. The dual-circuit design can decrease the refrigerant pressure drop through the condenser subsystem 160, providing a better system efficiency and coefficient of performance for a given thermal capacity. In cases that include two condenser circuits 162, the two circuits 162 can each receive refrigerant from a condenser split 161 disposed along the flow path of the compressor outlet 134. Alternatively, the compressor 125 can include two outlets to provide refrigerant to both condenser circuits 162 (e.g., one outlet for the first condenser circuit 162a and one outlet for the second condenser circuit 162b). In yet another alternative, the heat pump system 100 can include two compressors 125 to provide refrigerant to both condenser circuits. As described above, however, having a single compressor 125 can decrease the electrical load of the system.

As a non-limiting example, the condenser subsystem 160 can include two circuits 162, as illustrated, although one, three, or more circuits 162 are contemplated. As illustrated, the condenser circuit 162a and the second condenser circuit 162b can be coiled around the outer surface of the water tank 11 to provide conductive heating to the water tank 11 (e.g., as shown in FIG. 1C). It is contemplated that the first condenser circuit 162a and the second condenser circuit 162b can be wrapped in parallel around the water tank 11 from a position nearer the top of the water tank 11 to a position nearer the bottom of the water tank 11. Alternatively or in addition, one or more circuits can be wrapped around the water tank 11 from a position nearer the bottom of the water tank 11 to a position nearer the top of the water tank 11. Alternatively or in addition to wrapping the condenser subsystem 160 around the water tank 11, one or both of the first condenser circuit 162a and the second condenser circuit 162b can instead be disposed within the water tank 11 to directly heat the water within the water tank 11. One or more openings can be provided in the top, bottom, and/or side of the water tank 11 for insertion of the condenser circuits 162, and the opening can be covered such that the water tank 11 is fully sealed.

After the condensers circuit(s) 162 of the condenser subsystem 160 provide heat to the water tank 11, the cooled and liquified refrigerant can flow to an expansion valve 170. In systems with two condenser circuits 162, the two circuits 162 can join at an expansion convergence 172, and flow into the expansion valve 170 via an expansion inlet 174. As will be appreciated, the expansion valve 170 can ensure that the proper amount of liquified refrigerant is supplied to each of the evaporators 122 in the evaporator subsystem 120, such that liquified refrigerant enters the evaporator(s) 122 and vaporized refrigerant exits the evaporators(s) 122. As described above, the supply of refrigerant can also be facilitated by a refrigerant distributor 126 that can provide equal and/or predetermined distribution amounts of refrigerant to each of the coil inlet(s) 124. The refrigerant distributor 126 can be in fluid communication with the expansion valve 170 via an expansion outlet 176 at a first end and can be in fluid communication with the coil inlet(s) 124 at a second end. Distribution conduits 178 can supply the refrigerant to the coil inlet(s) 124. The heat pump system 100 can optionally include a filter dryer 180 placed between the expansion inlet 174 and the expansion valve 170.

The heat pump water heater 100 can include a fan 110. The fan can be located at any point in the intended flow path of air through the heat pump water heater 100, such as proximate an air inlet 102 or proximate an air outlet 104. As depicted, the fan 110 is located at the air outlet 104 and is configured to pull air through the air inlet(s) 102, across the evaporator(s), and out of the air outlet 104. The fan 110 can be any type of fan configured to direct air across at least a portion an evaporator coil. The fan 110, for example, can be an axial-flow fan, a centrifugal fan, a crossflow fan, or any other type of fan suitable for the application so long as the fan 100 is configured to direct air across an evaporator coil. The fan 100 can be coupled with a variable-speed motor or a single-speed motor, depending on the application.

Referring to FIGS. 2A-3B and as described more fully herein, the controller 101 can be configured to receive temperature data from one or more temperature sensors and, based at least in part on the temperature data, output instructions for the compressor 125 to deactivate (thus stopping operation of the heat pump system 100) and instructions for the fan to operate in a first direction such that air is moved in through the air inlet(s) 102 and pushed moved out through the air outlet(s) 104. More specifically, the fan 110 can move air into the heat pump system 100 through the air inlet(s) 102, across the evaporator(s) 120, through the interior of the evaporator housing, and out the air outlet(s) 104. The controller 101 can be configured to operate the fan in the first direction at a given speed based at least in part on the temperature data.

Figure 4A:
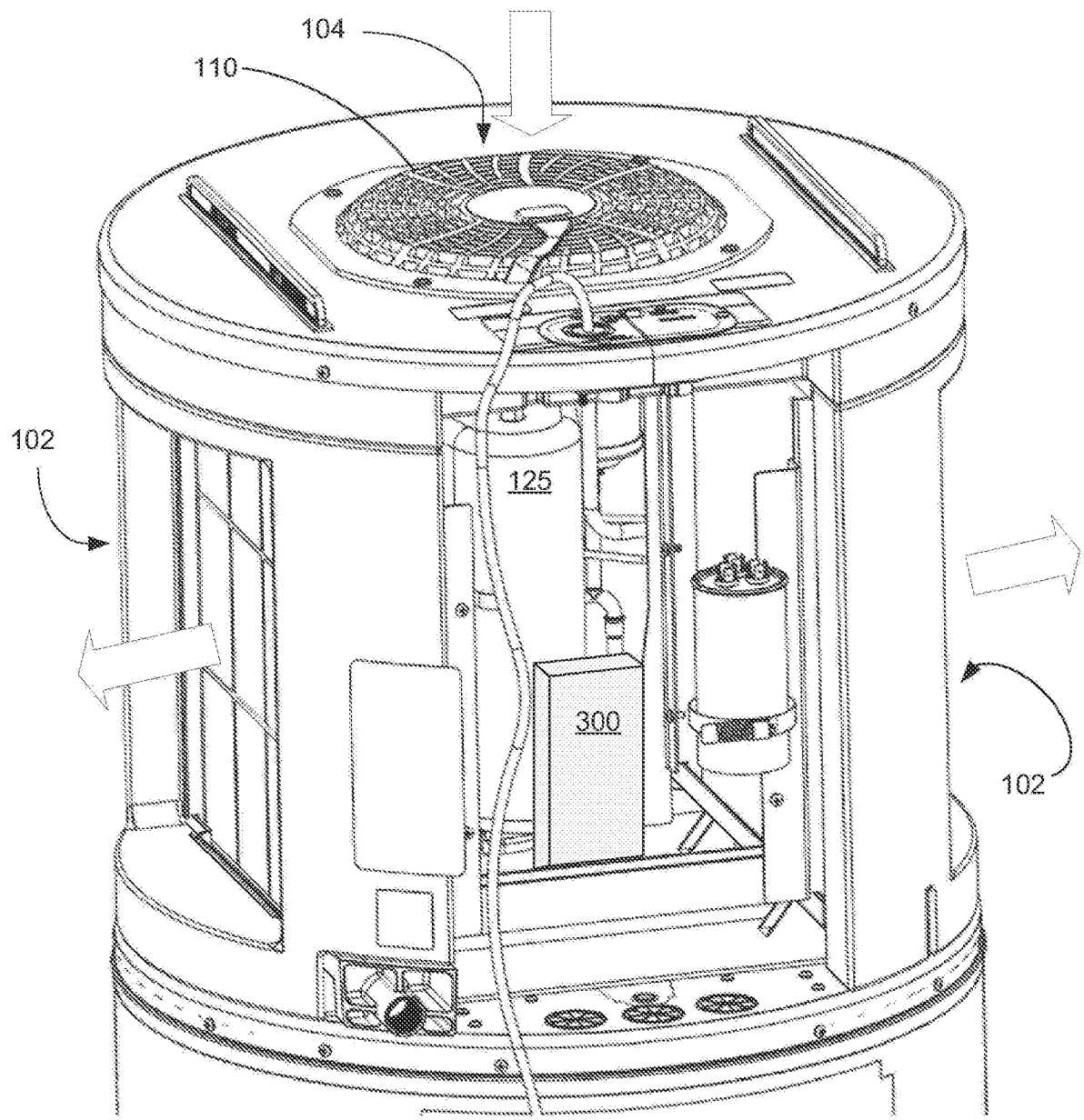
Figure 4B:
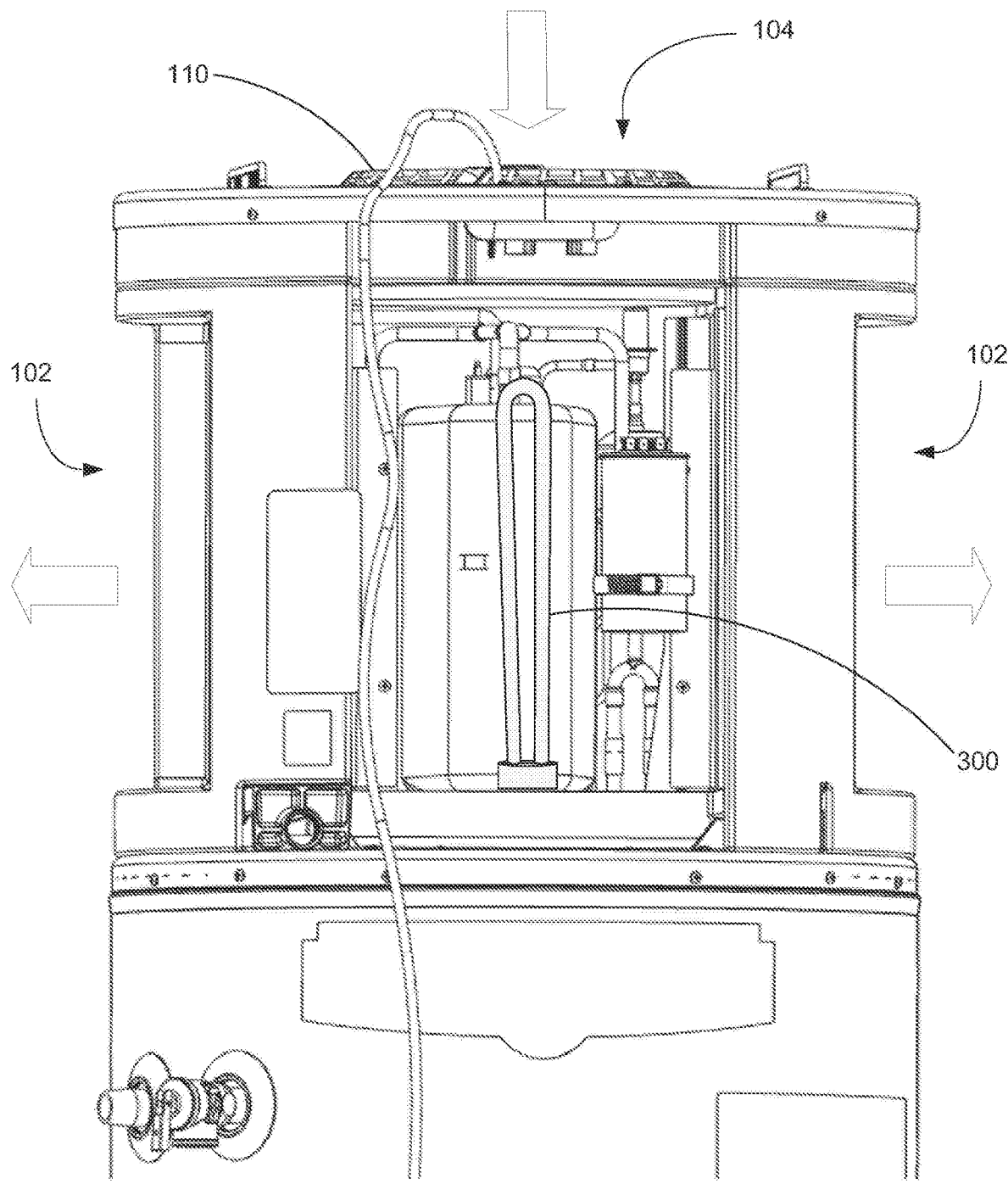

Referring to FIGS. 4A and 4B and as described more fully herein, the controller 101 can be configured to receive temperature data from one or more temperature sensors and, based at least in part on the temperature data, output instructions for the compressor 125 to deactivate (thus stopping operation of the heat pump system 100) and instructions for the fan to operate in a second direction such that air is moved in through the air outlet(s) 104 and pushed moved out through the air inlet(s) 102. That is, the fan 110 can be operated in a reverse direction. More specifically, the fan 110 can move air into the heat pump system 100 through the air outlet(s) 104, across the evaporator(s) 120, through the interior of the evaporator housing, and out the air inlet(s) 102. The controller 101 can be configured to operate the fan 110 in the second direction at a given speed based at least in part on the temperature data.

As shown in FIGS. 3A-4B, the heat pump system 100 can include a heating element 300. The heat pump system 100 can include a single heating element 300 or a plurality of heating elements. The heating element 300 can be of any type, size, and/or shape (e.g., wire or ribbon, straight, or coiled. For example the heating element 300 can be a resistance type, a ceramic type, a semiconductor type, and/or a thick film heater type. The heating element 300 can comprise metal, ceramic, any other materials for producing heat, or a combination thereof. The heating element 300 can be positioned inside the evaporator housing (e.g., in the space between the two evaporators 122) and/or below the fan 110. The heating element 300 can be positioned in a location that is within the flow path of air traveling to or from the evaporator(s) 122. The heating element 300 can be attached to the tank 11 and/or the evaporator housing at a location at or near the bottom the of evaporator housing (e.g., on or near the top of the tank 11). Alternatively or in addition, the heating element 300 can be attached to, or at a location near, the top of the evaporator housing, such as immediately below the fan 110. Alternatively or in addition, the heating element 300 can be attached to, or at a location near, a side of the evaporator housing, such as at a location proximate an evaporator 122. The heating element can be in communication with the controller 101 such that the controller 101 can be configured to control operation of the heating element, including, but not limited to, activation, deactivation, and amount of heat outputted.

Optionally, the controller 190 can be in communication with an air recirculation system for heat pumps, such as any of the air recirculation systems described in U.S. patent application Ser. No. 17/094,158, the entire contents of which are incorporated herein by reference. As will be appreciated, the incorporation of air recirculation system can enable faster heating and/or defrosting of the evaporator coils 122, which can decrease energy consumption by the fan 110 and/or the heating element 130.

Figure 5:
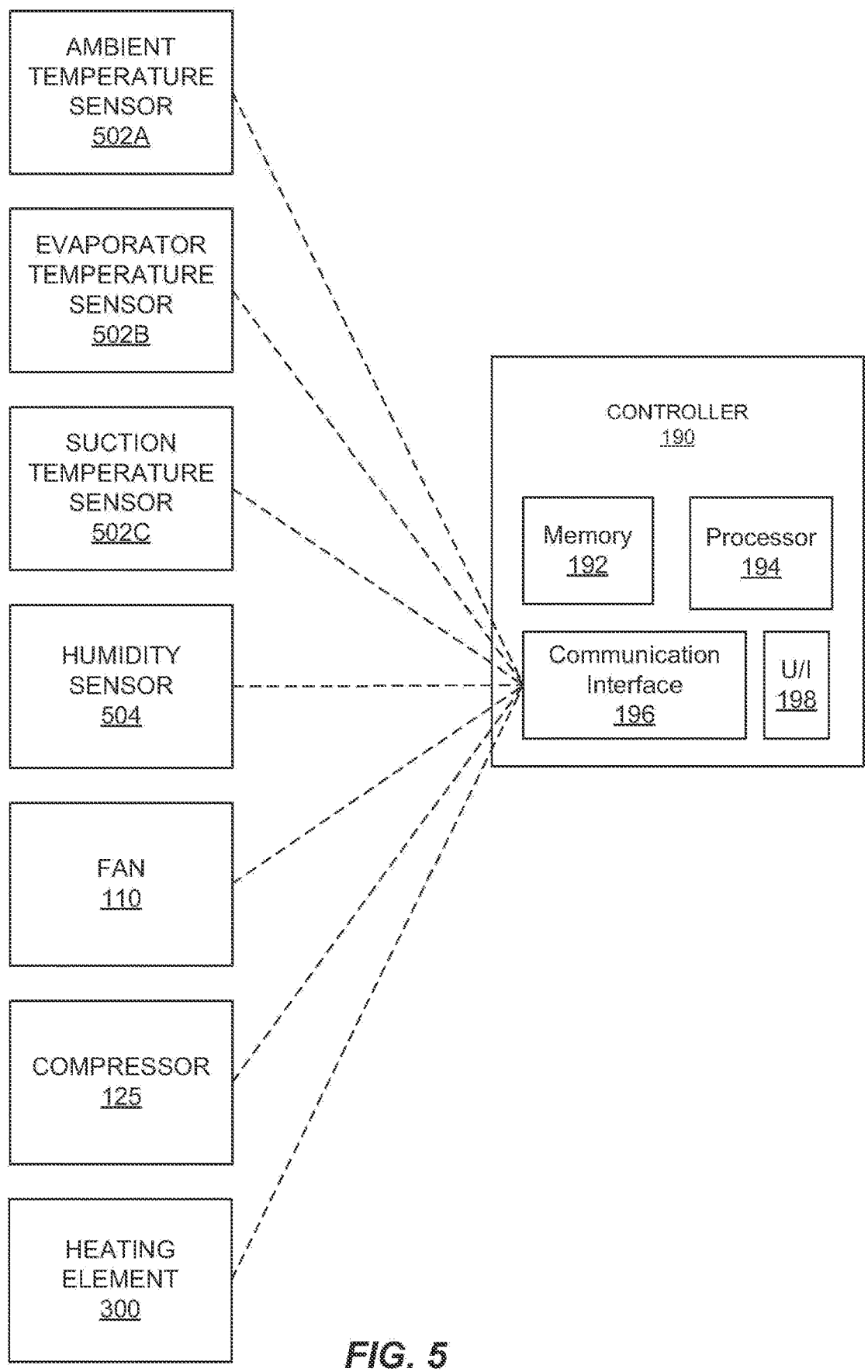
FIG. 5 illustrates a schematic diagram of a controller and various components of a heat pump water heater, in accordance with the disclosed technology.

Referring to FIG. 5, the controller 190 can be in electronic communication with one or more sensors (e.g., one or more temperature sensors 502, one or more humidity sensors 504), the fan 110, and/or the compressor 125. One or more of the temperature sensors 502 can be or include a temperature sensor. As non-limiting examples, the temperature sensors 502 can include an ambient temperature sensor 502$a$ configured to measure a temperature of the ambient air at or near the heat pump system 100, an evaporator temperature sensor 502$b$ configured to measure a temperature of an evaporator 122, and/or a suction temperature sensor 502$c$ configured to measure a temperature of the suction line of the heat pump system's 100 refrigerant circuit. One, some, or all of the temperature sensors 502 can be or include a thermocouple, a resistor temperature detector (RTD), a thermistor, an infrared sensor, a semiconductor, or any other suitable type of sensor for the application.

One, some, or all of the temperature sensors 502 can be configured to detect a particular temperature and output the detected temperature to the controller 190. The temperature sensor(s) 502 can be configured to detect temperatures continuously or periodically when the heat pump system 100 is shut down, while the heat pump system 100 is operating, or both. The temperature sensor(s) 502 can be installed at any useful location.

For example, the ambient temperature sensor 502$a$ can be installed at, on, in, or remote from a housing of the heat pump system 100 (e.g., the evaporator housing). The ambient temperature sensor can be provided by a third-party (e.g., a website providing local weather information). Regardless of location, the ambient temperature sensor 502$a$ can be configured to provide the temperature of the environment in which the heat pump system 100 (and specifically the evaporator(s) 122 of the heat pump system) is located.

As another example, the evaporator temperature sensor 502$b$ can be installed directly on the surface of the evaporator coil 122, inside of the evaporator coil 122, partially inside of the evaporator coil 122, or near the evaporator coil 122. Additionally, the evaporator temperature sensor 502$b$ can be configured to measure the surface temperature, the core temperature, a temperature of a portion of the evaporator coil 122, or any other method of measuring as would be suitable for the particular application and arrangement. Alternatively or in addition, the suction temperature sensor 502$c$ can be configured to measure one or more temperatures of the suction line, such as surface temperature, the core temperature, a temperature of a portion of the suction line, or any other method of measuring as would be suitable for the particular application and arrangement.

Alternatively or in addition, a humidity sensor 504 can be configured to measure a humidity of the environment in which the heat pump system 100 (and specifically the evaporator(s) 122 of the heat pump system) is located. The humidity sensor 504, sometimes referred to as a hygrometer, can be any type of humidity sensor configured to detect a level of water vapor in the ambient air. For example, the humidity sensor 504 can be a capacitive, resistive, thermal, gravimetric, optical, or any other suitable type of humidity sensor for the application. The humidity sensor 504 can be configured to measure absolute humidity, relative humidity, or specific humidity and can send digital or analog signals to the controller 190.

As an illustrative example to explain how the system 100 can be configured to reduce frost accumulation on an evaporator coil 122, the controller 190 can be configured to receive an input from the ambient temperature sensor 502*a* to determine the temperature of the outside air and the controller 220 can determine if the ambient air temperature is below a predetermined temperature threshold or within a predetermined temperature range where frost is likely to accumulate on the evaporator coil 122. For example, if the ambient air temperature is between 30° F. and 47° F., the controller 190 can be configured to determine that frost is likely to have accumulated on the evaporator coil 122 and output instructions for the fan 110 to run for a predetermined period of time (e.g., 5 minutes) after the heat pump system 100 has been shut down. The instructions can simultaneously instruct the compressor 125 to deactivate, thereby shutting down the heat pump system 100.

The controller 190 can also be configured to determine to operate in a defrost mode (e.g., deactivate the compressor 125 and operate the fan 110) based on input from the ambient temperature sensor 502*a* (i.e., whether the ambient temperature is below a predetermined threshold or within a predetermined temperature range) and/or the evaporator temperature sensor 502*b* (i.e., whether the evaporator temperature is below a predetermined threshold or within a predetermined temperature range). The predetermined threshold and/or temperature ranges for ambient temperature and evaporator temperature can be the same, at least partially overlap, and/or be different entirely. As an illustrative example, if the ambient air temperature is between 30° F. and 47° F. and the temperature of the evaporator coil 122 is equal to or less than 32° F., the controller 190 can be configured to output instructions for the compressor 125 to deactivate, for the fan 110 to run for a predetermined amount of time after the heat pump heating system 100 has been shut down, and/or for the fan 110 to run until the evaporator temperature increases to greater than or equal to a second predetermined threshold or outside of the predetermined range. The second predetermined threshold can be equal to the evaporator temperature's first predetermined threshold and/or an endpoint of the evaporator temperature's aforementioned predetermined temperature range.

Likewise, the controller 190 can be configured to receive an input from the suction temperature sensor 502*c* and can compare the received suction temperature to a predetermined threshold and/or a predetermined temperature range. The controller 190 can be configured to determine to deactivate the compressor 125 and/or activate the fan 110 based on any combination of temperature data. The controller can be configured to operate the fan 110 for a predetermined period of time or until one or more types of temperature increase to greater than or equal a corresponding threshold or into or out of a predetermined temperature range.

The controller 190 can be configured to receive an input from the humidity sensor 504 to determine, based on the concentration of water vapor in the ambient air, whether frost is likely to accumulate on the evaporator coil 122. For example, the controller 190 can be configured to receive an input from the humidity sensor 504 and the evaporator temperature sensor 502*b* to determine that frost is likely to have accumulated on the evaporator coil 122. The controller 190 can then output instructions for the fan 110 to operate for a predetermined amount of time or until the temperature of the evaporator increases to be greater than or equal to a predetermined threshold or into or out of a predetermined temperature range. The humidity data can be combined with any combination of other data (e.g., temperature data) to determine whether frost is likely to accumulate or to have accumulated.

Alternatively, the controller 200 can be configured to receive an input from the humidity sensor 316 and the ambient temperature sensor 312 to determine that, based on the water vapor concentration in the ambient air and the ambient air temperature, that frost is likely to have accumulated on the evaporator coil 210. The controller 220 can then output a control signal to run the fan 214 for a predetermined length of time after the heat pump heating system 100 has been shut down to defrost the evaporator coil 210.

The controller 190 can be configured to operate the fan 110 at various speeds depending on the magnitude of discrepancy between measured data and the corresponding threshold or data range (e.g., temperature, humidity). For example, the controller 190 can be configured to operate the fan 110 at a first speed if the ambient temperature is less than or equal to a first threshold and at a second speed if the ambient temperature is less than or equal to a second threshold that is less than the first threshold.

Alternatively or in addition, the controller can be configured to operate the fan 110 in reverse, such that air is drawn in through the air outlet(s) 104 and pushed out through the air inlet(s) 102. As will be appreciated, during operation, the compressor 125 will produce heat. However, when the compressor 125 is running, the evaporator coil 122 remains cold and can accumulate frost under certain circumstances. By ceasing operation of the compressor 125, the evaporator coil 122 ceases to be cooled by the heat pump system 100, but the residual heat from the compressor can be moved across the evaporator coil 122 to eliminate or prevent any frost. Depending on the relative positioning of the compressor 125, the fan 110, the evaporator 122, the air inlet 102, and/or the air outlet 104, it can be beneficial to operate the fan 110 in the forward direction or the reverse direction to take better advantage of the compressor's 125 residual heat. For example, in certain configurations, operating the fan 110 in the forward direction will generally move ambient air across the evaporator 122, and operating the fan 110 in the reverse direction will generally move residual heat from the compressor 125 across the evaporator 122. Alternatively, the reverse can be true, depending on the system configuration. Optionally, the controller 190 can be configured to select from either the forward direction or reverse direction depending on the temperature and/or humidity data (e.g., operating the fan 110 in the forward direction to utilize ambient air when the evaporator coil temperature or suction line temperature below a first temperature threshold and operating the fan 110 in the reverse direction to utilize residual heat from the compressor 125 when the evaporator coil temperature or suction line temperature is below a second predetermined threshold that is less than the first predetermined threshold).

The controller 190 can be configured to eliminate frost by the fan 110 and/or the controller 190 can be configured to eliminate frost by activate the heating element 300 (e.g., for ambient temperatures less than 32° F.). As will be appreciated, the fan 110 and/or the heating element 300 can each be powered on for varying lengths of time and at varying capacities. One or both components can be activated for the same predetermined amount of time, different predetermined periods of time, or until a certain temperature (e.g., evaporator temperature) increases to a level greater than or equal to a predetermined threshold or into or out of a predetermined temperature range.

Figure 6:
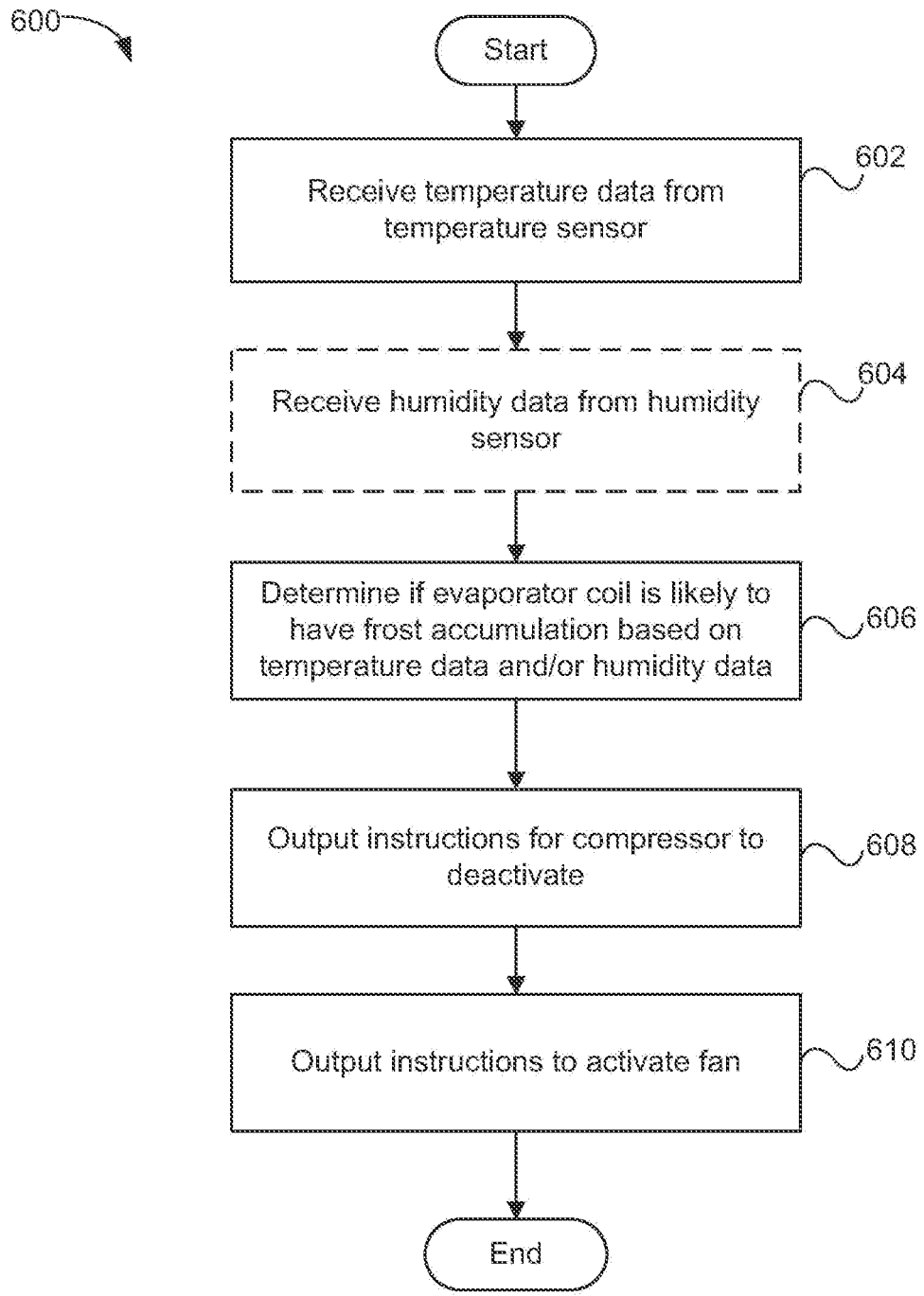
FIG. 6 illustrates a flow chart for an example method for reducing frost accumulation on an evaporator coil of a heat pump's water heater, in accordance with the disclosed technology.

FIG. 6 is a flow diagram illustrating a method 600 of reducing frost accumulation on an evaporator coil, in accordance with the disclosed technology. FIG. 6 is not meant to limit the methods of reducing frost accumulation on an evaporator coil but is offered merely for illustrative purposes. Furthermore, one of skill in the art will understand that the method 600 depicted in FIG. 6 can be altered as necessary to encompass the various aspects of the disclosed technology expressly described herein or other configurations not expressly discussed.

The method 600 can include receiving 602 temperature data from one or more temperature sensors (e.g., ambient temperature sensor 502a, evaporator temperature sensor 502b, and/or suction temperature sensor 502c). Optionally, the method 600 can include receiving 604 humidity data from a humidity sensor (e.g., humidity sensor 504). The method 600 can include determining 606 if the evaporator coil (e.g., evaporator 122) is likely to have frost accumulation based on the temperature data and/or humidity data. The method 600 can include outputting 608 instructions for the compressor (e.g., compressor 125) to deactivate, thereby deactivating the heat pump system (e.g., heat pump system 100) has shut down, and outputting 610 instructions for the fan (e.g., fan 110) to move air across the evaporator coil (e.g., for a predetermined amount of time, in a certain direction). As previously described, the method can include operating the fan for various amounts of time as would be suitable for the particular application and the particular conditions.

Figure 7:
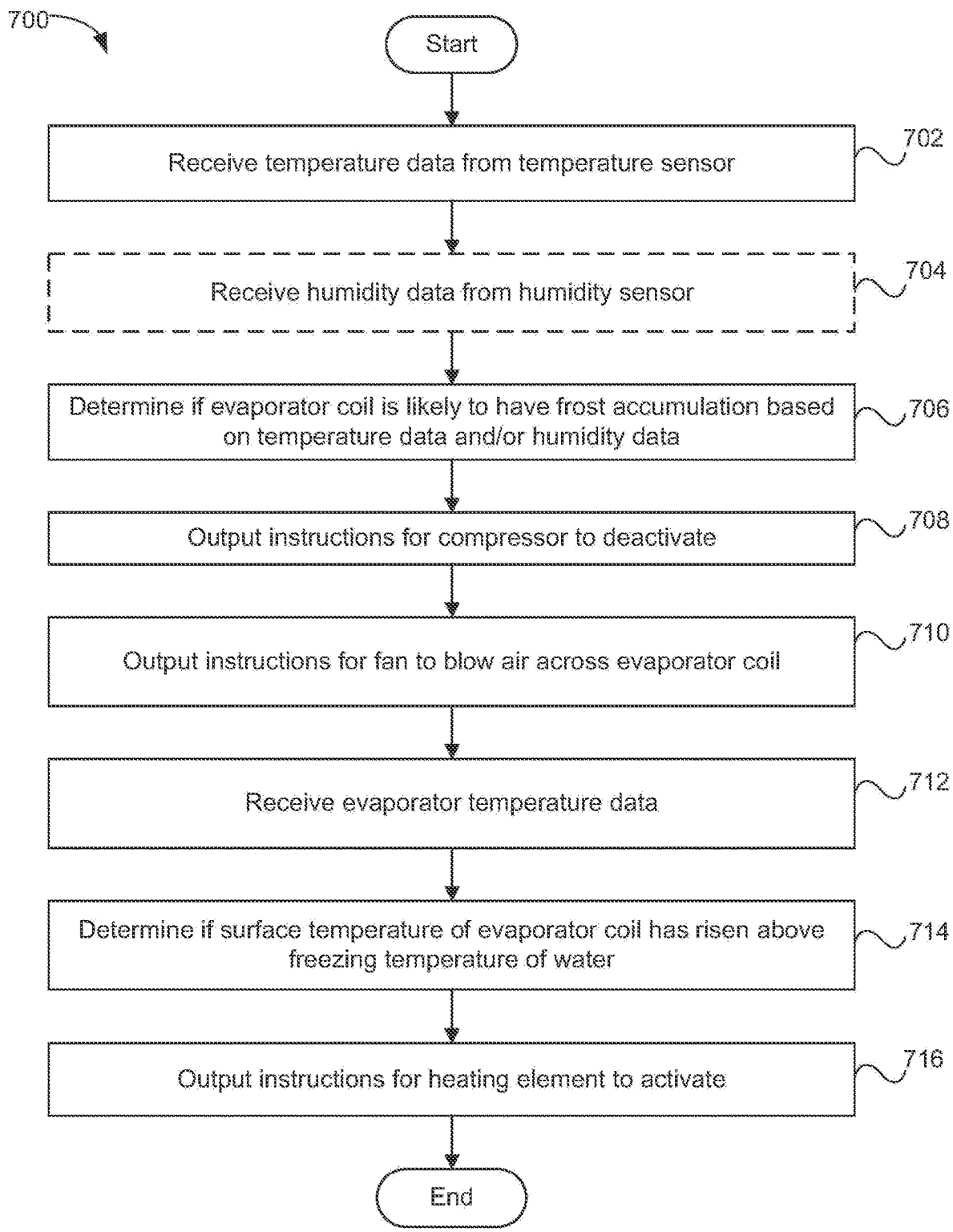
FIG. 7 illustrates a flow chart for an example method for reducing frost accumulation on an evaporator coil of a heat pump's water heater, in accordance with the disclosed technology.

FIG. 7 is a flow diagram illustrating a method 700 of reducing frost accumulation on an evaporator coil, in accordance with the disclosed technology. FIG. 7 is similarly not meant to limit the methods of reducing frost accumulation on an evaporator coil but is offered merely for illustrative purposes. Furthermore, one of skill in the art will understand that the method 700 depicted in FIG. 7 can be altered as necessary to encompass the various aspects of the disclosed technology expressly described herein or other configurations not expressly discussed.

The method 700 can include receiving 702 temperature data from one or more temperature sensors (e.g., ambient temperature sensor 502a, evaporator temperature sensor 502b, and/or suction temperature sensor 502c). Optionally, the method 700 can include receiving 704 humidity data from a humidity sensor (e.g., humidity sensor 504). The method 700 can include determining 706 if the evaporator coil (e.g., evaporator 122) is likely to have frost accumulation based on the temperature data and/or humidity data. The method 700 can include outputting 708 instructions for the compressor (e.g., compressor 125) to deactivate, thereby deactivating the heat pump system (e.g., heat pump system 100) has shut down, and outputting 710 instructions for the fan (e.g., fan 110) to move air across the evaporator coil (e.g., for a predetermined amount of time, in a certain direction). The method 700 can also include receiving 712 temperature data from the coil temperature sensor and determining 714 if the temperature of the evaporator coil has risen above the freezing temperature of water to determine whether it is likely that accumulated frost has melted off of the evaporator coil. The method 700 can include outputting 716 instructions for a heating element (e.g., heating element 300) to activate and provide heat. Optionally, outputting 716 instructions for the heating element can be performed before receiving 712 evaporator temperature data and/or determining 714 whether the temperature of the evaporator coil has risen above the freezing temperature of water.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "one example," "an example," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Further, certain methods and processes are described herein. It is contemplated that the disclosed methods and processes can include, but do not necessarily include, all steps discussed herein. That is, methods and processes in accordance with the disclosed technology can include some of the disclosed while omitting others. Moreover, methods and processes in accordance with the disclosed technology can include other steps not expressly described herein.

Throughout the specification and the claims, the following terms take at least the meanings explicitly associated herein, unless otherwise indicated. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

Moreover, while certain aspects and examples of the disclosed technology have been expressly described as a system, a method, or computer-readable instructions, it is contemplated than any given description or example of a certain form (e.g., system, method, computer-readable instructions) can be likewise implements in another form.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heat pump water heater system, comprising:
a refrigerant circuit;
an evaporator coil in fluid communication with the refrigerant circuit;
a fan configured to move air in a first direction through an inlet then across the evaporator coil and then trough an outlet when the heat pump water heater system is heating water and move air in a second direction through the outlet then across the evaporator coil and then through the inlet when operating in a defrost mode;
one or more temperature sensors;
a heating element located proximate an air flow path between the fan and the evaporator coil; and
a controller configured to:
receive temperature data from the one or more temperature sensors; and
in response to the temperature data, output defrost instructions for:
the heating element to activate;
the heat pump water heater system to stop heating the water; and
the fan to change from a configuration to move air in the first direction to a configuration to move air in the second direction across the heating element then the evaporator coil to defrost the evaporator coil using the air blown by the fan and then through the inlet, wherein the heating element is configured to heat the air blown by the fan.

2. The heat pump water heater system of claim 1, wherein the evaporator coil is a first evaporator coil, the heat pump water heater system further comprising a second evaporator coil in fluid communication with the refrigerant circuit.

3. The heat pump water heater system of claim 2, wherein the first evaporator coil is located on a first side of an evaporator housing and the second evaporator coil is located on a second side of the evaporator housing, the heating element being disposed between the first and second evaporator coils.

4. The heat pump water heater system of claim 1, wherein the defrost instructions for the heating element to activate are in response to determining that the temperature data indicates a temperature less than a predetermined temperature threshold.

5. The heat pump water heater system of claim 1, wherein the controller is further configured to: output defrost instructions for the heating element to activate are in response to determining that the temperature data indicates a temperature of the evaporator coil is greater than a predetermined temperature threshold.

6. The heat pump water heater system of claim 1, wherein the one or more temperature sensors comprises:
an ambient temperature sensor configured to detect a temperature of ambient air at a location of the heat pump water heater system; or
an evaporator temperature sensor configured to detect a temperature of at least a portion of the evaporator coil.

7. The heat pump water heater system of claim 1, wherein the defrost instructions instruct the fan to move the air toward the evaporator coil for a predetermined duration.

8. The heat pump water heater system of claim 1, further comprising a humidity sensor configured to detect a humidity of ambient air, wherein the controller is further configured to:
receive humidity data from the humidity sensor; and
output the defrost instructions for the fan to move the air toward the heating element to the evaporator coil in response to the humidity data indicates a humidity greater than or equal to a predetermined humidity threshold.

9. The heat pump water heater system of claim 1, further comprising:
a water tank configured to hold the water for heating;
a condenser coil in fluid communication with the refrigerant circuit and in thermal communication with the water tank; and
a compressor in fluid communication with the refrigerant circuit.

10. A non-transitory, computer-readable medium having instructions stored thereon that, when executed by one or more processors, causes a heat pump water heater controller to:
receive temperature data from one or more temperature sensors; and
in response to determining, based at least on part on the temperature data, that frost accumulation on an evaporator coil of a heat pump water heater is likely:
output first instructions for the heat pump water heater to stop heating water;
output second instructions for a heating element of the heat pump water heater to activate; and
output third instructions for a fan of the heat pump water heater to change from a first configuration to move air in a first direction through an inlet then across the evaporator coil and then trough an outlet when the heat pump water heater is heating water to a second configuration to move air in a second direction through the outlet then across the evaporator coil to defrost the evaporator coil and then through the inlet, wherein the heating element heats the air blown by the fan.

11. The non-transitory, computer-readable medium of claim 10, wherein the instructions, when executed by the one or more processors, further cause the heat pump water heater controller to:
receive humidity data from a humidity sensor of a heat pump water heater system; and
output the first instructions, the second instructions, and the third instructions in response to determining, based at least in part on the temperature data and the humidity data, that frost accumulation on the evaporator coil is likely.

12. A method for operating a heat pump water heater system, the method comprising:
positioning a heating element proximate an air flow path between a fan and an evaporator coil of the heat pump water heater system;
receiving temperature data from one or more temperature sensors of the heat pump water heater system; and
causing, based on the temperature data, the fan to reverse direction from a first direction that moves air through an inlet then across the evaporator coil and then trough an outlet when the heat pump water heater system is heating the water to a second direction through the outlet then across the evaporator coil to defrost the evaporator coil and then through the inlet, wherein the heating element heats the air blown by the fan.

13. The method of claim 12, further comprising:
activating, based on the temperature data, the heating element.

14. The method of claim 13, wherein the temperature data indicates a temperature of the evaporator coil is greater than a predetermined temperature threshold.

15. The method of claim 12, further comprising:
moving the air blown by the fan across the evaporator coil for a predetermined duration.

16. The method of claim 12, further comprising:
receiving humidity data from a humidity sensor; and
causing, based on the humidity data, the fan to move the air blown by the fan across the heating element to the evaporator coil.

* * * * *